(12) United States Patent
Lammers

(10) Patent No.: US 8,081,652 B2
(45) Date of Patent: Dec. 20, 2011

(54) INTEGRATED UNIVERSAL INPUT-OUTPUT INTERFACE CIRCUIT

(75) Inventor: Ronald Lammers, Hilversum (NL)

(73) Assignee: Snap-On Incorporated, Kenosha, WI (US)

( * ) Notice: Subject to any disclaimer, the term of this patent is extended or adjusted under 35 U.S.C. 154(b) by 349 days.

(21) Appl. No.: 11/914,746

(22) PCT Filed: May 31, 2005

(86) PCT No.: PCT/NL2005/000395
§ 371 (c)(1),
(2), (4) Date: Apr. 6, 2009

(87) PCT Pub. No.: WO2006/130000
PCT Pub. Date: Dec. 7, 2006

(65) Prior Publication Data
US 2009/0213872 A1    Aug. 27, 2009

(51) Int. Cl.
*H04J 3/00* (2006.01)
(52) U.S. Cl. ...................................................... 370/464
(58) Field of Classification Search .................... None
See application file for complete search history.

(56) References Cited

U.S. PATENT DOCUMENTS

| 6,064,299 | A | 5/2000 | Lesesky et al. | |
|---|---|---|---|---|
| 6,104,988 | A | 8/2000 | Klarer | |
| 6,563,418 | B1 | 5/2003 | Moon | |
| 2004/0008724 | A1* | 1/2004 | Devine et al. | 370/466 |
| 2004/0076178 | A1* | 4/2004 | Botton | 370/466 |
| 2005/0105558 | A1* | 5/2005 | Doidge et al. | 370/474 |
| 2005/0276278 | A1* | 12/2005 | Jung et al. | 370/466 |

FOREIGN PATENT DOCUMENTS

EP    0472018    2/1992

* cited by examiner

*Primary Examiner* — Chi Pham
*Assistant Examiner* — Fan Ng
(74) *Attorney, Agent, or Firm* — McDermott Will & Emery LLP

(57) ABSTRACT

A circuit for enabling communication between a micro-controller device and a number of data networks using different network protocols comprises a switch circuit and a number of interface circuits. The switch circuit is configured to connect input-output terminals of the data network to corresponding terminals of the interface circuits. The interface circuits are configured to convert the data formatted according to the network protocol of the data network to data formatted in accordance with the micro-controller device communication protocol.

11 Claims, 1 Drawing Sheet

INTEGRATED UNIVERSAL INPUT-OUTPUT INTERFACE CIRCUIT

The present invention relates to an integrated circuit for connecting a micro-controller device to a data network.

In an automotive vehicle, one or more data networks connect a number of devices and systems. Operative elements such as an ECU (electronic control unit) connected to the network may be set up and/or diagnosed through a connection via the network. For communication on the network, a communication protocol is employed to format the data to be transferred into a data stream comprising said data and network communication specific data. Numerous protocols exist. A person skilled in the art readily understands how such a network protocol functions. Furthermore, the data network may comprise a number of communication lines operating together to transfer data.

If an operative element of the data network of the automotive vehicle is to be set up or diagnosed, a micro-controller device, e.g. a computer may be connected to the data network. Usually, dedicated connector for an external connection is provided and the micro-controller device may be connected thereto. Thus, a physical connection may be established. However, for communication, the communication protocol of the micro-controller device should be identical to the network communication protocol and the number of communication lines of the network should be suitably connected to the micro-controller device.

With a number of different data networks in automotive vehicles, it is known to provide a standard interface circuit for connecting the micro-controller device to data network of the automotive vehicle through the interface circuit. The interface circuit communicates with the data network using the network protocol and using the protocol specific functions. The interface circuit further communicates with the micro-controller device using the controller protocol. Thus, having a number of such interface circuits, it is possible to use one standard micro-controller device for setting up and diagnosing operative elements connected to a number of data networks using different network protocols.

Using the above-mentioned known interface circuits an operator of the micro-controller device needs to select the correct interface circuit and connect it between the micro-controller device and the network connector. Moreover, since a number of different data networks may be present in one vehicle, the operator may need to select and connect an interface circuit more than once per vehicle. Furthermore, a number of interface circuits need to be stored and be collected when needed. In summary, the operator needs to perform a number of actions to establish a connection with the data network.

It is desirable to, have a single interface circuit that is suited to connect a number of types of data networks to the micro-controller device.

In an aspect of the present invention an integrated circuit for connecting a micro-controller device to a data network is provided. The data network uses a network communication protocol and the micro-controller device uses a controller communication protocol to communicate. The integrated circuit comprises:
 an input terminal connectable to a number of communication lines of the data network;
 an output terminal connectable to the micro-controller;
 at least two interface circuits for converting an input data stream formatted in accordance with the network communication protocol into an output data stream formatted in accordance with the controller communication protocol;
 a switch circuit for connecting selected ones of the communication lines of the input terminal to corresponding communication lines of a corresponding one of the at least two interface circuits, the corresponding one interface circuit being configured to convert the data stream corresponding to the network communication protocol into a data stream corresponding to the controller communication protocol and to supply the data stream formatted in accordance with the controller communication protocol to said output terminal.

The integrated interface circuit according to the present invention comprises a number of interface circuits. To connect to the data network the communication lines of the input terminal connected to the data network need to be connected to the corresponding inputs of the corresponding interface circuit. Since the number and the arrangement of communication lines may differ depending on the network, a switch circuit is configured to make the correct connections between communication lines and the corresponding interface circuit and to activate the corresponding interface circuit. An output of the interface circuit is connected to an input of the micro-controller device such that a communication connection between the micro-controller device and the data network may be established.

The switch circuit routes the input data stream to the corresponding interface circuit as mentioned above. Thereto, the switch circuit needs to determine or needs to be instructed which protocol is used by the network. In an embodiment the switch circuit is configured to determine from the data stream which protocol is used. In another embodiment, the micro-controller device provides instructions to the switch circuit on the protocol used.

Connections to be made between the communication lines of the input terminal and the interface circuit corresponding to the protocol used may be indicated in a switch matrix that is stored in a switch matrix memory. In that case the switch circuit is configured to access the switch matrix memory for determining the selected ones of the communication lines to be connected to corresponding communication lines of the corresponding interface circuit.

The integrated circuit may have an extension terminal for a connection to an external interface circuit, and the switch matrix may be provided with data indicating corresponding connections to be made between selected ones of the communication lines. Thus, if another network protocol is introduced, it may easily be combined with the integrated circuit by providing a corresponding interface circuit and connecting it to the extension terminals of the integrated circuit. The switch matrix memory is provided with suitable data for the correct connections between the communication lines. Thus, it is prevented that, when another network protocol is introduced, multiple interface circuits are needed again as known from the above-indicated prior art.

The switch matrix memory may be embedded in the integrated circuit. However, in an embodiment, the integrated circuit has a control input terminal connected to the switch circuit for enabling a connection to an external switch matrix memory. Thus, the switch matrix may be stored in any memory, for example a memory of the micro-controller device. Such an embodiment provides an easy method for updating the switch matrix and provides easy control of the switch circuit.

In an embodiment, the integrated circuit comprises a general processing unit and a memory storing network protocol instructions. The memory may store a number of instruction sets. Each instruction set is dedicated for communication using a certain network protocol. The processing unit may perform the conversion of the input data stream in accordance with corresponding instructions of one of said instruction sets stored in said memory. This embodiment is specifically suitable for upgrading with other network protocols, since a network protocol interface may be provided by only programming a memory.

Further advantages and features of the invention will become clear from a description of the appended drawing, showing non-limiting embodiments of the invention, in which.

Figure 1:
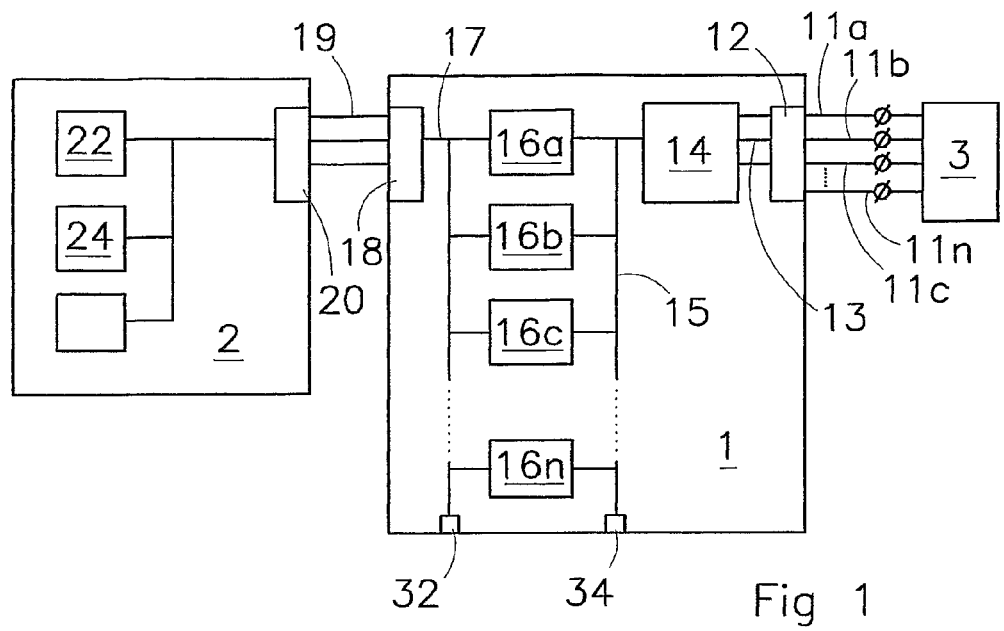
FIG. 1 shows a diagram of an integrated circuit according to an embodiment of the present invention.

FIG. 1 shows an integrated circuit 1 connected between a micro-controller device 2 and a data network 3 of an automotive vehicle. The micro-controller device 2 is a standard device communicating with an external device via a predetermined communication connection 19 using a predetermined controller protocol, e.g. a serial connection. An input terminal 20 provides the data to a micro-controller 22. An additional circuit 24 may be provided to perform communication protocol specific functions.

The data network 3 uses a network protocol for communication between operative elements connected to the data network. Examples of such data networks and their protocols for automotive vehicles are CAN, VPW, PWM, J1850, CCD and ISO. The data network 3 may comprise a number of communication lines 11a, 11b, ..., 11n. The communication lines of the data network 3 may be connected to an input terminal 12 of the integrated circuit 1. Via connection 13 the communication lines 11 are connected to a switch circuit 14. Via connection 15, the switch circuit 14 is further connected to a number of interface circuits 16a, 16b, ..., 16n. Via connection 17, the interface circuits 16a-16n are connected to terminal 18 that may be connected to the terminal 20 of the micro-controller device 2.

Figure 2:
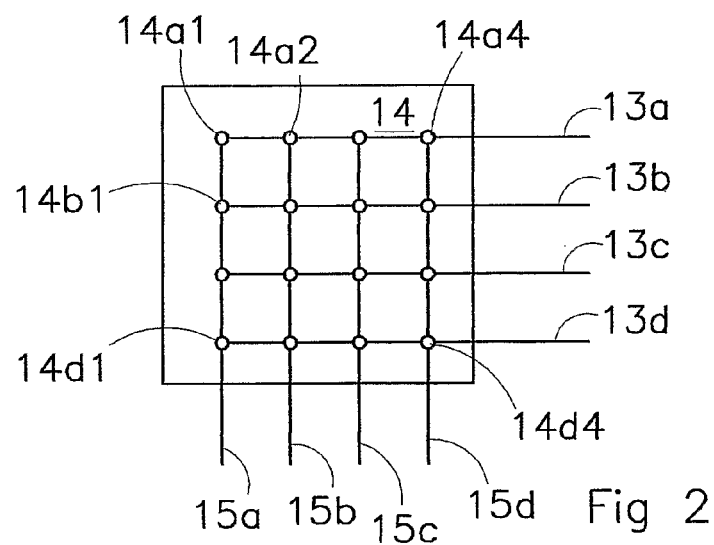
FIG. 2 shows a diagram of a switch circuit.

FIG. 2 shows the switch circuit 14 schematically. Communication lines 13a-13d being part of connection 13 (FIG. 1) are connected to a first set of terminals of the switch circuit 14. Further, communication lines 15a-15d being part of connection 15 (FIG. 1) are connected to a second set of terminals of the switch circuit 14. It is noted that the number of four communication lines 13a-13d and 15a-15d is solely for the purpose of illustration and may be any other number; likewise, the number of communication lines 13a-13d may differ from the number of communication lines 15a-15d depending on the configuration.

The switch circuit 14 comprises an array of sixteen switches 14a1-14d4. Using the switches 14a1-14d4, any communication line 13a-13d may be connected to any communication line 15a-15d. The state of each switch 14a1-14d4 depends on the network protocol of the data network 3 (FIG. 1). Which state each switch 14a1-14d4 should have may be controlled by the micro-controller device 2 or may be stored in a switch matrix memory accessible by the switch circuit 14. Thus, the switch circuit 14 enables to connect the communication lines 11 to the corresponding inputs of the corresponding interface circuit 16 without requiring a separate input terminal per protocol.

Referring to FIG. 1 again, there may be bi-directional communication between the micro-controller device 2 and the data network 3. Thus, a data stream may be received by the terminal 18. The data stream then is to be converted into a data stream formatted in accordance with the network protocol of the data network 3. Only one of the interface circuits 16a-16n needs to perform said conversion.

In an embodiment, a control signal is supplied to each interface circuit 16a-16n indicating whether or not any of the interface circuits 16a-16n is to convert the data stream. The switch circuit 14 is at the same time switched such that the output of any of the interface circuits 16a-16n is supplied to any of the corresponding communication lines 11a-11n of the terminal 12. In another embodiment, each interface circuit 16a-16n performs the conversion, but only the output of one of the interface circuits 16a-16n is connected to the terminal 12 through the switch circuit 14.

The integrated circuit 1 may be provided with extension terminals 32 and 34. Another interface circuit may be connected to these extension terminals 32 and 34. Providing the switch circuit 14 with corresponding connections of the communication lines in the connection 15 enables a simple upgrade of the system.

Figure 3:
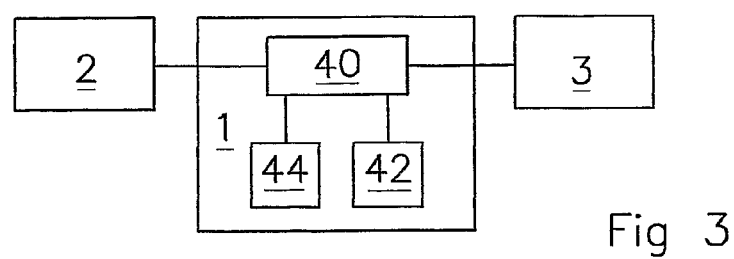
FIG. 3 shows a diagram of an integrated circuit according to another embodiment of the present invention.

FIG. 3 illustrates another embodiment of the present invention. The integrated circuit 1 is connected between the micro-controller device 2 and the data network 3. The integrated circuit 1 comprises a general processing unit 40, a switch matrix memory 42 and a protocol instruction set memory 44. The general processing unit 40 is connected to the communication lines of the data network 3 and to the communication lines of the micro-controller device 2. For ease of illustration, terminals 20, 18, 12 and the like are omitted in FIG. 3. The general processing unit 40 is enabled to access the memories 42 and 44.

The general processing unit 40 may access the switch matrix memory 42 to determine which communication line carries a signal, and what kind of signal is carried. Then, using the protocol instructions found in the protocol instruction set memory 44 the general processing unit 40 may convert an input data stream. Of course the integrated circuit 1 may be configured to interface unidirectional (e.g. diagnosing) or bi-directional (e.g. setting up) communication. The embodiment illustrated is in particular suitable for easy implementation of other protocols, since an update, i.e. reprogramming, of one or both of the memories 42 and 44 may enable conversion of a previously not supported protocol.

The invention claimed is:

1. An integrated circuit for connecting a micro-controller device to a data network of an automotive vehicle, the data network using a network communication protocol and the micro-controller device using a controller communication protocol, the circuit comprising:

an input terminal configured to connect to a number of communication lines of the data network;

an output terminal configured to connect to the micro-controller;

a first interface circuit configured to convert an input data stream formatted in accordance with a first network communication protocol into an output data stream formatted in accordance with the controller communication protocol;

a second interface circuit configured to convert an input data stream formatted in accordance with a second network communication protocol into an output data stream formatted in accordance with the controller communication protocol; and a switch circuit configured to determine a network communication protocol of the input data stream, wherein:

upon determining the network communication protocol of the input data stream corresponds to the first network communication protocol, the switch circuit connects the input terminal to the first interface circuit, thereby providing the input data stream formatted in accordance with the first network communication protocol to the first interface circuit, the first interface circuit converts the input data stream formatted in accordance with the first network communication protocol to a data stream formatted in accordance with the controller communication protocol to supply the data stream formatted in accordance with the controller communication protocol to the output terminal, and upon determining the network communication protocol of the input data stream corresponds to the second network communication protocol, the switch circuit connects the input terminal to the second interface circuit, thereby providing the input data stream formatted in accordance with the second network communication protocol to the second interface circuit, the second interface circuit converts the input data stream formatted in accordance with the second network communication protocol to a data stream formatted in accordance with the controller communication protocol to supply the data stream formatted in accordance with the controller communication protocol to the output terminal.

2. The integrated circuit according to claim 1, wherein the switch circuit is configured to access a switch matrix memory for determining from a switch matrix stored in the switch matrix memory which ones of the communication lines of the input terminal are to be connected to communication lines of the first interface circuit and which ones of the communication lines of the input terminal are to be connected to communications lines of the second interface circuit.

3. The integrated circuit according to claim 2, wherein the circuit has an extension terminal for a connection to an external interface circuit, and the switch matrix is provided with data indicating corresponding connections to be made between the communication lines of the input terminal and the communication lines of the first and second interface circuits.

4. The integrated circuit according to claim 3, wherein the integrated circuit has a control input terminal connected to the switch circuit for enabling a connection to an external switch matrix memory.

5. The integrated circuit according to claim 3, wherein the switch matrix memory is a reprogrammable memory.

6. The integrated circuit according to claim 2, wherein the integrated circuit has a control input terminal connected to the switch circuit for enabling a connection to an external switch matrix memory.

7. The integrated circuit according to claim 2, wherein the switch matrix memory is a reprogrammable memory.

8. An integrated circuit for coupling a micro-controller device to a data network of an automotive vehicle, wherein the data network uses a network communication protocol and the micro-controller device uses a controller communication protocol, the circuit comprising:

input terminal means for coupling to a number of communication lines of the data network;
output terminal means for coupling to the micro-controller;
a first interface means for converting an input data stream formatted in accordance with a first network communication protocol into an output data stream formatted in accordance with the controller communication protocol;
a second interface means for converting an input data stream formatted in accordance with a second network communication protocol into an output data stream formatted in accordance with the controller communication protocol; and
a switch means for determining a network communication protocol of the input data stream, wherein:
upon determining the network communication protocol of the input data stream corresponds to the first network communication protocol, the switch means connect the input terminal to the first interface circuit, thereby providing the input data stream formatted in accordance with the first network communication protocol to the first interface means, the first interface means convert the input data stream formatted in accordance with the first network communication protocol to a data stream formatted in accordance with the controller communication protocol to supply the data stream formatted in accordance with the controller communication protocol to the output terminal means, and
upon determining the network communication protocol of the input data stream corresponds to the second network communication protocol, the switch means connect the input terminal to the second interface means, thereby providing the input data stream formatted in accordance with the second network communication protocol to the second interface means, the second interface, means convert the input data stream formatted in accordance with the second network communication protocol to a data stream formatted in accordance with the controller communication protocol to supply the data stream formatted in accordance with the controller communication protocol to the output terminal means.

9. An integrated circuit for connecting a micro-controller device to a data network of an automotive vehicle, the data network using a network communication protocol and the micro-controller device using a controller communication protocol, the circuit comprising:

an input terminal configured to connect to a number of communication lines of the data network;
an output terminal configured to connect to the micro-controller;
at least two interface circuits for converting an input data stream formatted in accordance with the network communication protocol into an output data stream formatted in accordance with the controller communication protocol;
a switch circuit configured to connect selected ones of the communication lines of the input terminal to a corresponding one of the at least two interface circuits, the corresponding one interface circuit being configured to convert the data stream corresponding to the network communication protocol into a data stream corresponding to the controller communication protocol and to supply the data stream formatted in accordance with the controller communication protocol to said output terminal, wherein the switch circuit is configured to access a switch matrix memory for determining the selected ones of the communication lines to be connected to communication lines of the corresponding interface circuit from a switch matrix stored in the switch matrix memory; and
an extension terminal for a connection to an external interface circuit, wherein the switch matrix is provided with data indicating corresponding connections to be made between selected ones of the communication lines.

10. The integrated circuit according to claim 9, wherein the integrated circuit has a control input terminal connected to the switch circuit for enabling a connection to an external switch matrix memory.

11. The integrated circuit according to claim 9, wherein the switch matrix memory is a reprogrammable memory.

* * * * *